United States Patent
Kalkundrikar et al.

(10) Patent No.: US 10,516,777 B1
(45) Date of Patent: Dec. 24, 2019

(54) ENHANCED USER EXPERIENCE FOR VOICE COMMUNICATION

(71) Applicant: QUALCOMM Incorporated, San Diego, CA (US)

(72) Inventors: Vaman Rajaram Kalkundrikar, Hyderabad (IN); Sathish Sambaraju, Hyderabad (IN); Karthik Rangaraju, Hyderabad (IN); Mohammed Shaikh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/127,652

(22) Filed: Sep. 11, 2018

(51) Int. Cl.
*H04M 3/42* (2006.01)
*G10L 15/26* (2006.01)
*H04M 3/22* (2006.01)

(52) U.S. Cl.
CPC ....... *H04M 3/42221* (2013.01); *G10L 15/265* (2013.01); *H04M 3/2227* (2013.01); *H04M 3/2236* (2013.01)

(58) Field of Classification Search
CPC ....... G10L 15/22; G10L 15/265; H04L 12/24; H04L 12/26; H04M 3/2227; H04M 3/2236; H04M 3/42; H04M 3/42221; H04B 17/15
USPC ............. 370/252, 335; 379/68, 93.17, 32.02, 379/88.03, 201.01, 210.01, 265.02; 455/412.1, 414.1, 422.1, 435.1, 413, 417, 455/423, 434, 436, 437, 450, 519, 564; 704/235
See application file for complete search history.

(56) References Cited

U.S. PATENT DOCUMENTS

| | | | | | |
|---|---|---|---|---|---|
| 4,811,380 | A | * | 3/1989 | Spear | H04W 36/0055 455/437 |
| 5,239,571 | A | * | 8/1993 | Takahashi | H04M 1/72505 455/564 |
| 5,442,679 | A | * | 8/1995 | Regis | H04M 3/08 379/133 |
| 5,544,224 | A | * | 8/1996 | Jonsson | H04W 76/19 455/434 |
| 5,566,225 | A | * | 10/1996 | Haas | H04W 76/20 455/423 |
| 5,566,236 | A | * | 10/1996 | MeLampy | H04M 3/42229 379/210.01 |
| 5,590,177 | A | * | 12/1996 | Vilmur | H04W 36/18 455/436 |
| 5,995,830 | A | * | 11/1999 | Amin | H04M 3/42 455/423 |

(Continued)

*Primary Examiner* — Gerald Gauthier
(74) *Attorney, Agent, or Firm* — The Marbury Law Group, PLLC

(57) ABSTRACT

Methods, systems and devices are provided to enable voice activity following a call interruption or when a call experiences or will experience interruption or diminished quality such that call experience is affected to be relayed to the communication device of the other party to the call. When an indication that an active voice call with another communication device is or will experience interruption or diminished quality such that call experience is affected, audio received from a microphone of the communication device may be recorded. A message may be generated from recorded audio and the generated message may be transmitted to the other communication device. Generation and/or transmission of the message may be performed in response to user inputs.

30 Claims, 6 Drawing Sheets

(56) References Cited

U.S. PATENT DOCUMENTS

| | | | | |
|---|---|---|---|---|
| 6,246,872 B1 * | 6/2001 | Lee | H04W 76/10 | 455/414.1 |
| 6,343,216 B1 * | 1/2002 | Kim | H04W 76/19 | 455/450 |
| 6,594,485 B1 * | 7/2003 | Ezaki | H04W 4/20 | 455/417 |
| 6,633,760 B1 * | 10/2003 | Ham | H04Q 3/0025 | 455/414.1 |
| 6,667,962 B1 * | 12/2003 | Lee | H04W 36/16 | 370/335 |
| 6,745,031 B2 * | 6/2004 | Chun | H04W 76/19 | 455/435.1 |
| 7,228,145 B2 * | 6/2007 | Burritt | H04M 3/42195 | 455/519 |
| 7,272,399 B2 * | 9/2007 | Han | H04W 36/08 | 370/329 |
| 7,315,737 B2 * | 1/2008 | Duerk | H04M 3/53308 | 455/413 |
| 7,395,057 B2 * | 7/2008 | Awasthi | H04W 76/19 | 455/423 |
| 7,430,418 B2 * | 9/2008 | Kang | H04W 36/0055 | 370/335 |
| 7,466,800 B1 * | 12/2008 | Stillman | H04M 3/42204 | 379/201.02 |
| 7,676,224 B1 * | 3/2010 | Bellovin | H04W 4/12 | 455/423 |
| 7,856,230 B1 * | 12/2010 | Jones | H04W 76/19 | 455/422.1 |
| 8,295,838 B2 * | 10/2012 | Abdel-Kader | H04W 24/08 | 455/436 |
| 8,582,750 B2 * | 11/2013 | Lee | H04M 3/12 | 379/265.02 |
| 8,755,502 B1 * | 6/2014 | Schlesener | H04M 3/42 | 379/201.01 |
| 8,886,171 B2 * | 11/2014 | Muir, III | H04W 68/00 | 455/414.1 |
| 9,135,809 B2 | 9/2015 | Chang et al. | | |
| 9,414,247 B2 * | 8/2016 | Huang | H04L 41/0677 | |
| 9,560,206 B2 | 1/2017 | Jones et al. | | |
| 9,692,671 B2 * | 6/2017 | Groenendijk | H04L 41/5032 | |
| 9,843,672 B1 * | 12/2017 | Agrawal | H04M 3/42221 | |
| 10,045,167 B2 * | 8/2018 | Mese | H04W 4/16 | |
| 2004/0157606 A1 * | 8/2004 | Lee | H04W 76/19 | 455/435.1 |
| 2004/0203607 A1 * | 10/2004 | Satapathy | H04M 1/656 | 455/412.1 |
| 2005/0221815 A1 * | 10/2005 | Okabe | H04M 11/10 | 455/422.1 |
| 2006/0019650 A1 * | 1/2006 | Kedem | H04W 76/10 | 455/422.1 |
| 2008/0167868 A1 | 7/2008 | Kanevsky et al. | | |
| 2009/0257572 A1 * | 10/2009 | Klein | H04M 3/2272 | 379/93.17 |
| 2010/0198594 A1 * | 8/2010 | Gangemi | G10L 25/00 | 704/235 |
| 2010/0284293 A1 * | 11/2010 | Watanabe | H04L 41/5003 | 370/252 |
| 2017/0359458 A1 | 12/2017 | Rothschild | | |
| 2018/0109337 A1 * | 4/2018 | Yen | H04B 17/15 | |
| 2019/0096405 A1 * | 3/2019 | Kawamura | G10L 15/22 | |

* cited by examiner

ENHANCED USER EXPERIENCE FOR VOICE COMMUNICATION

BACKGROUND

Occasionally a telephone call will end before all parties to the call are finished speaking. One party may hang up thinking the call has ended, but the other party still has things to say. One of the parties to the call may lose connection to the call or their mobile phone may run out of power. One party may intentionally hang up because they want or need to end the call. Under any of these circumstances, the party that had more to say when the call ended must call back in order to convey their message. If that party cannot call back right away, for whatever reason, they might forget to call back or later forget what they had to say.

SUMMARY

Various embodiments include methods, systems, and devices in which voice activity following a call experiencing an interruption or will experience interruption or diminished quality such that call experience is affected may be relayed to another party. Various embodiments receive an indication that an active voice call with another communication device is or will experience an interruption or a diminished quality such that call experience is affected. Audio received from a microphone of the communication device may be recorded in response to receiving the indication that conversation from the active voice call is or will experience interruption or diminished quality such that call experience is affected. A message may be generated from recorded audio and transmitted to the other communication device.

In some embodiments, the processor may determine whether recorded audio includes speech and the generated message may include at least a portion of the speech within recorded audio. The processor may determine when a user of the communication device stops speaking in recorded audio and stop the recording of the audio when the user has stopped speaking. In some embodiments, the processor may determine whether a user of the communication device is speaking after receiving the indication that conversation from the active voice call with another communication device is or will experience interruption or diminished quality such that call experience is affected and include an audio recording including at least a portion of recorded audio. In some embodiments, the generated message may include a transcription of speech detected in at least a portion of recorded audio. In some embodiments, the generated message may further include additional information that identifies the voice call. In some embodiments, the generated message may include additional information directing a user of the other communication device to switch to another mode of communication. In some embodiments, the received indication may indicate that conversation from the active voice call is or will experience interruption or diminished quality such that call experience is affected and audio may be recorded while the active voice call remains active in response thereto.

Further embodiments may include a communication device having a processor configured with processor-executable software instructions to perform various operations corresponding to the methods summarized above. Further embodiments may include a communication device having various means for performing functions of the methods summarized above. Further embodiments may include a non-transitory processor-readable storage medium having stored thereon processor-executable instructions configured to cause a processor in a communication device to perform operations of the methods summarized above.

BRIEF DESCRIPTION OF THE DRAWINGS

The accompanying drawings are presented to aid in the description of embodiments of the disclosure and are provided solely for illustration of the embodiments and not limitation thereof.

DETAILED DESCRIPTION

Figure 1:
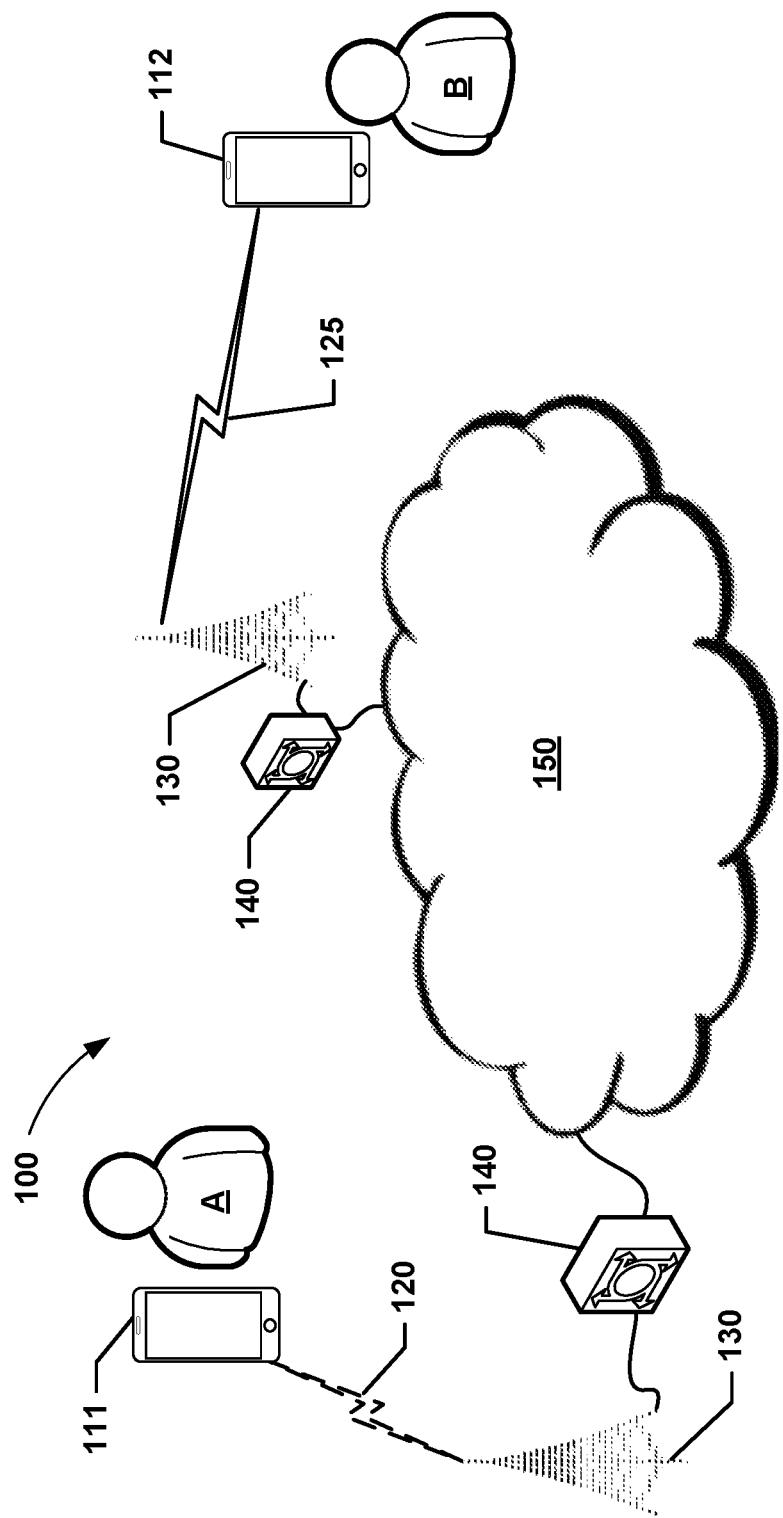
FIG. 1 is a communication system block diagram illustrating a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the disclosure or the claims. Alternate embodiments may be devised without departing from the scope of the disclosure. Additionally, well-known elements of the disclosure will not be described in detail or will be omitted so as not to obscure the relevant details of the disclosure.

The various embodiments provide methods that may be implemented in communication devices and communication systems for detecting when one party to an active voice call continues speaking after the active voice call is or will experience an interruption or diminished quality such that call experience is or will soon be affected, capturing such speech and forwarding the captured speech or a transcription of such speech to the other party to the call. The various embodiments enable one party to send to the other party words (as speech or text) that are spoken after the voice call is interrupted, thereby enhancing communications and potentially avoiding the need for a call back.

A telephone conversation may abruptly end or become unintelligible (e.g., inaudible or garbled) for any of a number of reasons, such as one party hanging up, an inadvertent button-push by either party, a network-caused termination, a loss of signal by either party's communication device, degradation of service on either party's communication device that renders words inaudible, and the like. In situations in which the quality of service is degrading (e.g., due to movement of one or both of the parties' communication devices) the processor of a communication device may be able to anticipate (i.e., determine that there is a likelihood of) interruption of the call as sounds becoming garbled or lost and/or termination of the call when a communication link to one of the communication devices is dropped. Therefore, various embodiments may be initiated by a processor of a communication device in response to either detecting interruption of a call (e.g., termination due to hang-up or network action) or determining that a call will be interrupted or diminished in quality such that call experience is/will be affected (e.g., due to degrading quality of service, a bad cell zone, etc.). The words "interrupted" and "interruption" are used herein as a general term to refer to any and all of the various ways that a conversation in an active voice call may be ended or rendered unintelligible.

In some embodiments, a processor of a communication device may continue to receive audio input from a microphone after receiving an indication that conversation from the active voice call is or will experience interruption or diminished quality such that call experience is/will be affected, such as from a degradation in quality of service of the call or an actual termination of the call. The processor may examine the captured audio input to determine whether the sound includes voice activity that would otherwise be unintentionally lost. Thus, various embodiments may improve mobile communication devices by enabling a user's speech that is cut off by an abrupt call interruption or a degraded call experience to be provided (as sound or transcribed text) to another participant in the call. Providing the user's speech that is cut off to another participant may provide a virtual continuity to the call and may eliminate the need for the user to call the other party back. In this way, when a call is interrupted or the service is significantly degraded, the user may continue speaking for a period of time as if the conversation discontinuity did not happen and then send the speech or a transcription of the speech to the other party to the call.

In some embodiments, the processor may examine audio input for a threshold period of time (e.g., a few seconds) just after the call is interrupted or degraded to detect continued talking, and stop monitoring the audio input if no voice activity is detected within that time. In some embodiments, the processor may save audio input received after the call has ended for a threshold period of time and then analyze the saved audio to determine whether the recorded sound includes voice activity. In response to detecting significant voice activity in the audio input following the call being interrupted or determining the call will experience an interruption or diminished quality such that call experience is affected, the processor may generate a message including or based upon the voice activity within the received and/or saved audio input and transmit the message to the other participant(s) of the interrupted/degraded call. In some embodiments, the transmission of the message may be automatic. In some embodiments, the user may be prompted to decide whether the message should be transmitted, and the message may be transmitted in response to receiving a user input approving the transmission.

As used herein, the term "audio" refers to sounds captured by a microphone that may be acted upon by a processor of a communication device. The microphone may be an onboard microphone of the communication device or a peripheral device (e.g., a headset or earbuds) connected to the processor via an intermediate connection, such as a wired or wireless connection, configured to sample ambient audio signals.

As used herein, the term "recording" refers to storing a digital version of the audio in a memory or a buffer in which data is stored, particularly data associated with the audio. Data stored in memory, such as a segment of an audio stream, may be processed, transferred, or transmitted in accordance with various embodiments.

As used herein, the term "computing device" refers to an electronic device equipped with at least a processor. Computing devices may include wireless communication devices (e.g., cellular telephones, wearable devices, smart-phones, web-pads, tablet computers, Internet enabled cellular telephones, Wi-Fi® enabled electronic devices, personal data assistants (PDAs), laptop computers, etc.), personal computers, and servers. In various embodiments, computing devices may be configured with memory and/or storage. Additionally, computing devices referred to in various example embodiments may be coupled to or include wireless communication capabilities implementing various embodiments, such as network transceiver(s) and antenna(s) configured to establish a local area network (LAN) connection (e.g., Wi-Fi® transceivers).

In various embodiments, audio received from a microphone of a communication device may be stored in order to preserve user speech that would otherwise be lost when an active voice call is interrupted or experiences a degradation of service such that call experience is affected. The audio may automatically be recorded locally immediately by the processor following receipt of an indication that the call is or will experience an interruption or diminished quality such that call experience is affected. The indication may be detected by a communication device's own modem or other processor or may be received from another communication device taking part in the call that is or will experience interruption or diminished quality such that call experience is affected. After or while audio is recorded on the communication device, a user may be provided controls for transmitting recorded audio, segments thereof, and/or a transcript of the audio to one or more other communication devices taking part in that call.

FIG. 1 illustrates a telecommunications network 100 suitable for controlling voice call audio transmissions between communication devices in accordance with various embodiments. The active voice call includes a first communication device 111 operated by a first user A and a second communication device 112 operated by a second user. The various embodiments are not limited to calls involving only two participants (e.g., A, B), but may apply to calls involving more than two participants (i.e., conference calls). The call participants A, B may use communication devices 111, 112 configured to establish and maintain connections using wireless signals 120, 125 with cell towers or base stations 130 of one or more radio access networks 150 in order to participate in the active voice call. For example, the communication devices 111, 112 may transmit/receive audio using wireless signals 120, 125 to base stations 130, which may be controlled by one or more base station controllers 140 and connected to one or more radio access networks 150. Each communication device 111, 112 may include a microphone for receiving local ambient noise, including speech, as audio. Also, each communication device 111, 112 may include a receiver and speaker for generating output audio for the active voice call. The first and second communication devices 111, 112 may be similar devices (e.g., the same make of communication device) or may be different communication devices (e.g., different makes or types of communication device).

The telecommunications network 100 may be a cellular data network, and may use channel access methods including, but not limited to, Frequency Division Multiple Access (FDMA), Time Division Multiple Access (TDMA), Code Division Multiple Access (CDMA), Universal Mobile Telephone System (UMTS) particularly Long Term Evolution (LTE)), Global System for Mobile Communications (GSM), Wi-Fi, PCS, 3G, 4G, 5G or other protocols that may be used. The telecommunications network 100 may use the same or different wireless interfaces and/or physical layers. The telecommunications network 100 may also include one or more servers, routers, base stations, and base station controllers, as is known in the art. Alternate network configurations may also be used and the embodiments are not limited to the configuration illustrated. For example, in another embodiment the functionality of at least one base station 130 and at least one base station controller 140 may be collapsed into a single "hybrid" module having the functionality of these components.

In various embodiments, the communication devices 111, 112 may also establish connections via Wi-Fi access points, which may connect to the Internet. In addition, while various embodiments are particularly useful with wireless networks, the embodiments are not limited to wireless networks and may also be implemented over wired networks with no changes to the methods. For example, various embodiments may be implemented using traditional wired telephone network connections that are part of the public switched telephone network (PSTN), so fixed telephone lines, fiber optic cables, microwave transmission links, cellular networks, communications satellites, and undersea telephone cables may be used to establish connections between the communication devices 111, 112.

The first communication device 111 of the first participant A may have initiated the active voice call to the second participant B, such as to the second communication device 112. Alternatively, second communication device 112 of the second participant B may have initiated the active voice call to the first participant A using the first communication device 111. As a further alternative, the first or second communication device 111, 112 may have received the active voice call from a third participant using a third communication device, which has already left the call. Any one or all of the communication devices 111, 112 may be any of a variety of devices, including, but not limited to, a mobile phone, laptop computer, tablet computer, PDA, server, etc.).

The first communication device 111 of the first participant A is illustrated as experiencing signal degradation in the wireless signals 120 (i.e., denoted by the dotted lines representation of the wireless signals 120). Such signal degradation may cause the first communication device to lose the connection to the active voice call. In accordance with various embodiments, once a processor of the first communication device 111 detects such a signal of call interruption or diminished quality such that call experience is affected, additional speech by the first participant A may be recorded and transmitted to the second communication device 112.

Figure 2:
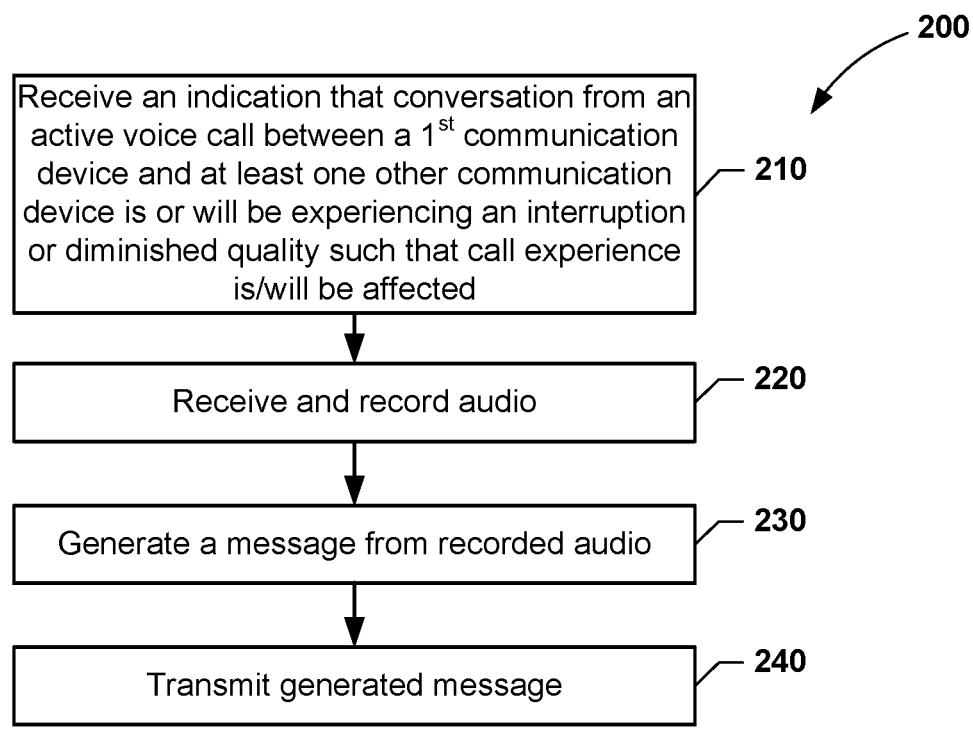
FIG. 2 is a process flow diagram illustrating a method of relaying voice activity following termination of a voice call to another communication device according to some embodiments.

FIG. 2 is a process flow diagram illustrating a method 200 in which voice activity following a call interruption or the call experiencing diminished quality such that call experience is affected, may be relayed to another party according to some embodiments. With reference to FIGS. 1-2, the method 200 may be performed by a processor, such as a processor of the first communication device (e.g., 111). A first communication device represents one of the communication devices, taking part in an active voice call, that receives an indication that the conversation in the active voice call is or will experience interruption or diminished quality such that call experience is affected. A second communication device represents another communication device taking part in the active voice call with the first communication device. Any device at any point during the call may be considered the first communication device if and/or when it receives an indication that conversation from the active voice call is or will experience interruption or diminished quality such that call experience is affected, such as degraded or interrupted.

Prior to the first communication device detecting that conversation from the active voice call is or will experience interruption or diminished quality such that call experience is affected, the method 200 may operate similar to a conventional voice call that communicates ongoing audio streams between communication devices. In this way, the first communication device may receive a real time audio stream from the second communication device, and vice versa. The real time audio stream from each communication device may include ambient sounds (i.e., audio) detected by a microphone of the respective communication device during the active voice call. The real time audio stream may be transmitted via a communication network (e.g., 100) from the second communication device to the first communication device.

In block 210, at any point after an active voice call has been established, the processor of the first communication device may receive an indication that conversation during the active voice call is or will experience interruption or diminished quality such that call experience is affected. For example, conversation from the active voice call is interrupted when the active voice call is somehow cut off or ended, such as by the other party hanging-up or by a network disruption. As another example, the processor may determine that the conversation from the active voice call is or will experience interruption or diminished quality such that call experience is affected when the active voice call experiences a degradation in quality of service due to any number of reasons. The processor may receive the indication that the conversation from active voice call is or is or will experience interruption or diminished quality such that call experience is affected from a modem or wireless communication transceiver detecting a drop in the quality of service up to and including a complete loss of signals from the network. For example, in Long Term Evolution (LTE) systems, a reference signal received power (RSRP) measured at a wireless communication transceiver may drop below a threshold level of power, which provides an indication that conversation from the active voice call is or will experience interruption or diminished quality such that call experience is affected. Additionally or alternatively, a modem of the first communication device being unable to decode the physical downlink control channel (PDCCH) or the physical downlink shared channel (PDSCH) may provide an indication to the device processor that conversation from the active voice call is or will experience interruption or diminished quality such that call experience is affected (e.g., the call has been interrupted or is likely to be interrupted). The processor may receive an indication from the network that the active voice call is interrupted, such as a message indicating that the first communication device is no longer connected to the active voice call. For example, a modem processor and/or main processor of the first communication device may detect that the wireless connection has been lost, which is a received indication that conversation from the active voice call has been interrupted.

In addition or alternatively, at any point after an active voice call has been established, the processor of the first communication device may receive an indication that conversation from the active voice call between the first communication device and at least one other communication device will experience interruption or diminished quality such that call experience is affected, such as when the active voice call experiences a degradation in service. For example, the first communication device may no longer be receiving audio from one or more second communication devices even though the call connection with the network remains established. The received indication that conversation from the active voice call is experiencing interruption or diminished quality such that call experience is affected may be one of various types of information that indicates the active voice call will experience interruption or diminished quality such that call experience is affected. For example, a modem processor and/or main processor of the first communication device may detect that the signal providing the wireless connection is weak (i.e., degraded beyond a threshold signal level), which is a received indication that conversation from the active voice call will experience interruption or diminished quality such that call experience is affected. The threshold signal level may be a level above which the first communication device may still communicate with the radio access network and attempt to convey a message regarding the signal degradation. The processor may receive the indication that conversation from the active voice call will experience interruption or diminished quality such that call experience is affected by detecting at the modem a short fall in quality of service (QoS), such as a low signal-to-noise ratio (SNR). For example, while an SNR between 7 dB to 10 dB may be acceptable for an active voice call, an SNR below 7 dB may be considered a condition in which a call is experiencing a degradation in service. The threshold upper limit for bit error rates (BER) or packet error rates (PER) associated with degradation in service may vary by type of communication service (e.g., SMS, voice mail, voice call, signaling, etc.). The measured BER and/or PER may be related to the quality of the signal under reception (e.g., SNR), which may go bad either due to some activity at the user end or environment factors such as fading. The processor may combine one or more of various inputs received from different layers in a protocol stack to determine whether an active voice call is experiencing a degradation in service and thus is or will experience interruption or diminished quality such that call experience is affected. Once a maximum BER or PER limit is detected or a minimum SNR limit is detected for a given technology, the processor may determine from such indications that conversation from the active voice call is or will experience interruption or diminished quality such that call experience is affected.

In block 220, the processor may receive and record audio in response to determining that conversation from the active voice call is or will experience interruption or diminished quality such that call experience is affected. The audio may be received from the microphone of the first communication device. The processor may activate or continue to access the microphone, if not already active, in order to receive the audio for analysis and possible transmission. The audio may be stored (i.e., recorded) in a buffer or other memory for subsequent analysis or handling.

In various embodiments, for the purposes of the method 200, the processor may be programmed to determine when the active voice call was intentionally ended (i.e., interrupted) by a user of the first communication device itself (e.g., the first participant A hangs up). For example, when the user of a communication device intentionally hangs up on a call, it usually means they do not wish to convey any further speech to the other participants to the call. The processor of the first communication device may be programmed to associate functions of the first communication device intended by the user to normally end a call as an indication that the call was intentionally interrupted. Thus, in response to the processor detecting that a call ending function has been activated by the user, the processor may prevent or stop the recording of audio in block 210. Alternatively, since occasionally a user accidentally hangs up on a call and may continue speaking without realizing the call has ended, various embodiments may further analyze recorded audio or make other determinations before stopping the recording of audio and considering the call intentionally interrupted.

In block 230, the processor may generate a message from recorded audio (i.e., stored in block 220). The generated message may include an audio recording or other multimedia file (e.g., a multimedia messaging service (MMS) message), a transcription of the recorded speech (e.g., a short message service (SMS) message), or a combination thereof. In addition, the generated message may include additional information that identifies the voice call with which the message is associated, such as the telephone numbers involved in the call, the date/time of the call, and/or other information useful for a recipient of the message to associate with the call. Optionally, the generated message may include more than one message. For example, in order to prevent the file size of the generated message from getting too large, the generated message may be broken up into more than one sub-message that may be more easily delivered to another participant.

In block 240, the processor may transmit the message generated in block 230. If the active voice call was interrupted due to the first communication device losing signal (i.e., connection to the wireless network was cut off), the processor may have to wait until a connection to a wireless network is regained before transmitting the generated massage. Once a connection is established with a communication network, the first communication device may transmit the generated message to at least one second communication device that took part in the active voice call. The processor may direct a transmitter of the first communication device to transmit the generated message via a telecommunication network (e.g., 100) to the at least one second communication device (e.g., 112). Alternatively, if the user of the first communication device immediately initiates a call-back to the second communication device, the processor may prompt the user to make sure the user still wants the message transmitted.

Figure 3:
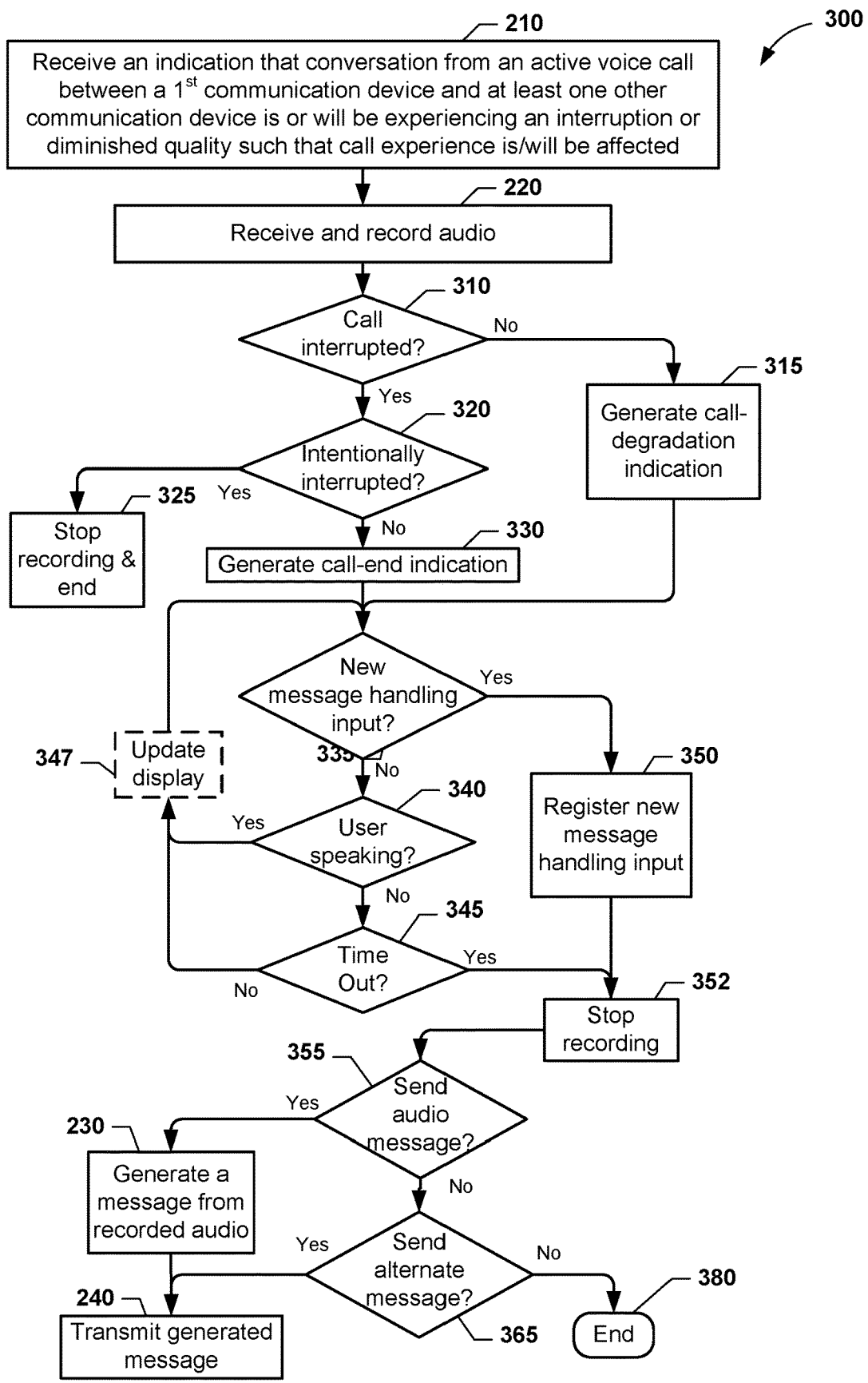
FIG. 3 is a process flow diagram illustrating a method of relaying voice activity following termination of a voice call to another communication device based on or in response to user inputs according to some embodiments.

FIG. 3 is a process flow diagram illustrating a method 300 in which voice activity following a call termination may be relayed to another party, according to some embodiments. With reference to FIGS. 1-3, the method 300 may be performed by a processor, such as a processor of the first communication device (e.g., 111). In the method 300, the processor may perform operations of blocks 210, 220, 230, and 240 as described with reference to the method 200 and FIG. 2.

In determination block 310, the processor of the first communication device may determine whether the active voice call is interrupted (i.e., "Call interrupted?"). The indication that the conversation from the active voice call is or will experience interruption or diminished quality such that call experience is affected, received in block 210, may reflect that the active voice call is either interrupted or that the active voice call has not been interrupted but is experiencing a diminished quality such that call experience is affected. Examples of indications that conversation from the active voice call is interrupted or will experience a diminished quality such that call experience is affected are described above with reference to block 210 of the method 200.

Figure 6:
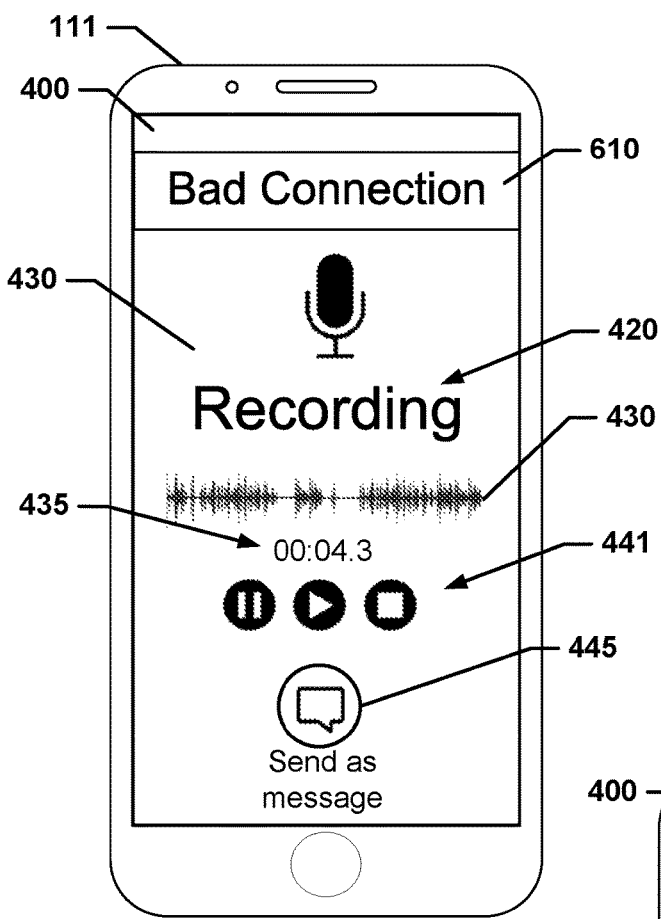
FIG. 6 is a diagram illustrating an embodiment display including a generated call bad connection indication in accordance with various embodiments.

In response to determining that the active voice call is not interrupted (i.e., determination block 310="No"), the processor may generate a call-degradation indication to the user in block 315 (e.g., 610 in FIG. 6).

In block 315, the generated call-degradation indication may include a change in a display of the first communication device, an audible sound, and/or a haptic feedback. The change in display may advise the user that the call is experiencing a degradation of service (e.g., displaying "Bad Connection"), and advise the user that degraded-call audio is being recorded (i.e., "recorded audio") and provide options to the user for managing and sending recorded audio or other message to other participants of the call.

In response to determining that the active voice call is interrupted (i.e., determination block 310="Yes"), the processor may determine whether the call was intentionally interrupted by the user of the first communication device in determination block 320 (i.e., "Intentionally interrupted?").

In some embodiments, the determination in determination block 320 may be based on an analysis of the audio recorded in block 220 (e.g., using voice recognition routines). This analysis of the audio recorded in block 220 may look for clear indications that the call was intentionally interrupted from the content of recorded audio. For example, one indication that the call was intentionally interrupted may be detected from a significant change in the volume of the user's speech, which may reflect that the user is now speaking away from the phone or to someone else. Other indications that the call was intentionally interrupted may be detected from context analysis of any recorded speech. For example, context analysis may determine that the user is speaking a different language. Alternatively, or additionally, context analysis may determine that the user is discussing a different topic, such as by performing speech recognition and analyzing the content or context of the speech. As a further example, context analysis may determine that the user is talking with another individual that can be heard by the first communication device microphone. Another indication that the call was intentionally interrupted may be detected from a lack of speech from the user. Yet another indication that the call was intentionally interrupted may be detected from a different voice, other than the user, speaking.

The active voice call may be interrupted when a connection of the first communication device to the call is lost or when the user of the first communication device hangs up. From the perspective of the first communication device, the connection to the active voice call may be lost due to a signaling failure or when the remote user operating the second communication device intentionally hangs up on the call. Nonetheless, if the connection to the active voice call is lost due to a signaling failure or the remote user hanging up, the processor of the first communication device may at least initially treat such a call termination as being non-intentional from the perspective of the user of the first communication device. The processor may additionally analyze the audio recorded in block 220, as described above, to look for indications that the call was intentionally interrupted.

In response to determining that the active voice call was intentionally interrupted (i.e., determination block 320="Yes"), the processor may stop the recording initiated in block 220 and end the process in block 325. Optionally, in block 325, the processor may clear (i.e., erase) the audio recorded in block 220. After the method 300 has ended in block 325, if/when a subsequent active voice call is established, the processor may once again initiate the method 300 when an indication is received that conversation from the subsequent active voice call is or will experience interruption or diminished quality such that call experience is affected in block 210.

Figure 4:
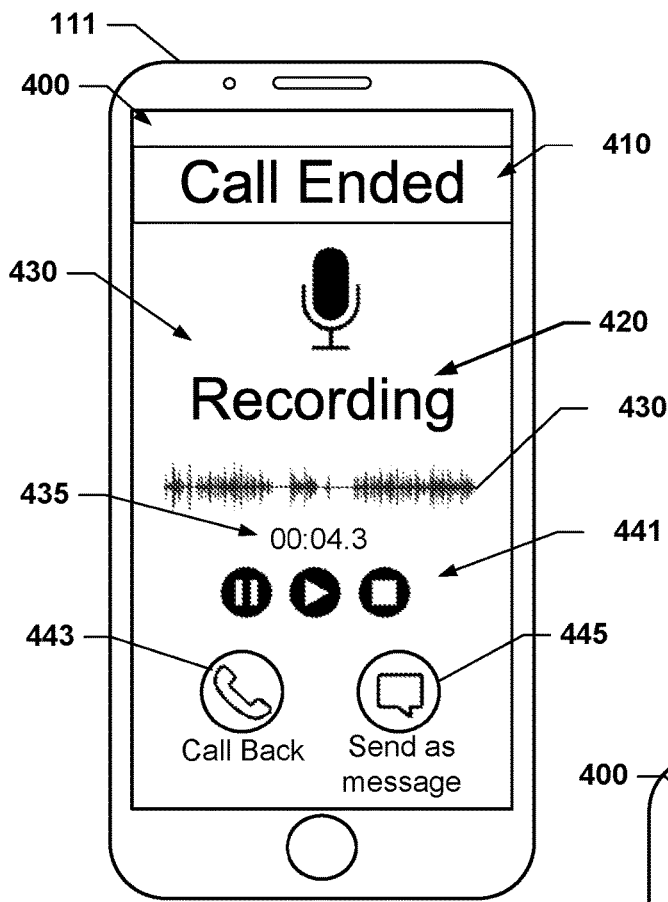
FIG. 4 is a diagram illustrating an embodiment display including a generated call-end indication in accordance with various embodiments.
Figure 5:
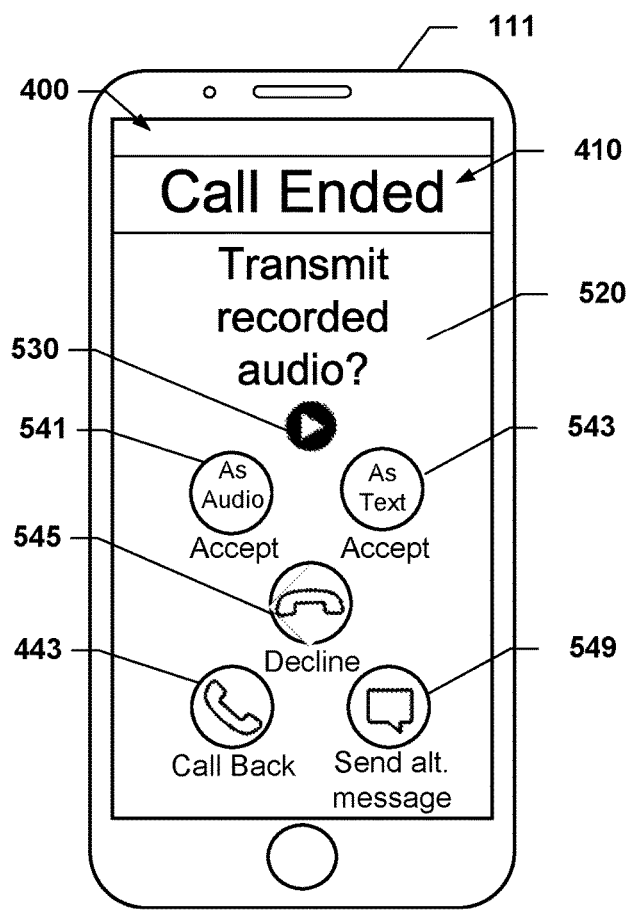
FIG. 5 is a diagram illustrating the embodiment display of FIG. 4 with additional call-end indications in accordance with various embodiments.

In response to determining that the active voice call was not intentionally interrupted (i.e., determination block 320="No"), the processor may generate a call-end indication in block 330 (e.g., 410 in FIGS. 4 and 5).

In block 330, the processor may generate a call-end indication to the user. The call-ended indication may include one or more of a change in a display of the first communication device (e.g., indication 410 illustrated in FIG. 4), an audible sound, and haptic feedback. In addition to the change in display advising the user that the call has interrupted (e.g., displaying "Call Ended"), the change in display may also advise the user that post-call audio is being recorded (e.g., "recorded audio") and provide options to the user for managing and sending recorded audio or other message to other participants of the call.

In determination block 335, the processor may determine whether a new message handling input is received. The new message handling input may include a user input configured to have the processor transmit a message, including and/or derived from recorded audio, to one or more other participants to the interrupted call. Alternatively, the user input may be configured to have the processor transmit an alternative message not derived from recorded audio but suggesting one or more other participants to the interrupted call switch to another mode of communication (e.g., text or voice messaging).

In response to determining that a new message handling input has been received (determination block 335="Yes"), the processor may register the new message handling input in block 350. In this way, the processor will not consider that message handling input a new message handling input in subsequent sequences of determination block 335, if applicable. Once the new message handling input is registered, the processor may stop the recording in block 352. Alternatively, the processor may stop the recording prior to or coincident with registering the new message handling input in block 350.

In response to determining that a new message handling input has not been received (determination block 335="No"), the processor may determine whether the user of the first communication device is speaking (i.e., "User speaking?") in determination block 340. If the user of the first communication device is no longer talking after the call has ended, it may mean that the user does not have additional speech that the user wants to convey to the other participant(s) to the call. To determine whether the user is speaking, in determination block 340, the processor may analyze recorded audio stored in the buffer (e.g., in block 220) to determine whether the audio contains speech (e.g., using voice recognition routines). In various embodiments, the processor may perform a speech-to-text function on recorded audio to identify words for determining whether the user of the first communication device is speaking. If words are positively identified, the processor may conclude that the user of the first communication device is speaking. Additionally, or alternatively, the identification of speech in recorded audio may be limited to the identification of predetermined conditions, such as use of one or more key words, a particular language, a recognized voice, a sensor input of the communication device, and/or other considerations used to analyze recorded audio. In this way, only when a positive identification of one or more of the predetermined conditions is made will the processor conclude that the user of the first communication device is speaking.

In response to determining that the user is not speaking (determination block 340="No"), the processor may determine whether a time-out period has elapsed in determination block 345. Otherwise, in response to determining that the user is speaking (determination block 340="Yes"), the processor may once again determine whether a new message handling input has been received in determination block 335. Optionally, in optional block 347, the processor may update a display to reflect that the determination that the user has been detected to be speaking.

In determination block 345, the processor may determine whether a time-out period P has elapsed since speech was detected following the termination of the active voice call. If no speech has been detected since the termination of the active voice call, then the time-out period may be coincident with a time of the termination of the active voice call. The time-out period P may prevent the first communication device from unnecessarily recording audio that does not contain speech. For example, the time-out period P may be a relatively short time (e.g., 10-20 seconds) measured from either when the call ended or when the user last spoke, whichever is later. If measured from the termination of the active voice call, the time-out period may be measured from an actual time associated with the termination of the active voice call, a received time of the indication that conversation from the active voice call was interrupted, or some other time associated with the termination of the active voice call.

In response to determining that the time-out period P has elapsed (i.e., determination block 345="Yes"), the processor may stop the recording in block 352. In contrast, in response to determining that the time-out period P has not elapsed (i.e., determination block 345="No"), the processor may once again determine whether a new message handling input has been received in determination block 335. Optionally, the processor may update a display to reflect that a time-out period is running out in optional block 347.

In block 350, the processor may register new message handling inputs entered into or received by the first communication device. Message handling inputs may include a user input configured to have the processor transmit a message or directing the process to end in block 380. Registering the new message handling inputs may designate the inputs in categories, such as inputs to send audio messages or inputs to send alternative messages not derived from recorded audio. The new message handling inputs that indicate that an alternative message should be sent may also include the content of that alternative message. The alternative message may not be derived from any content of recorded audio, but rather may include other text, audio, or video messaging from the user. For example, the alternative message may include some predefined text message informing others that the first communication device has lost a connection to the call. Also, the alternative message may recommend that the other participant(s) switch to text-based communications.

In determination block 355, the processor may determine whether an audio message should be sent. The processor may make this determination by checking whether any new message handling inputs associated with the most recent interrupted call indicate that all or some version of recorded audio should be sent to another participant of the interrupted active voice call. For example, the processor may compare the register of new message handling inputs (e.g., block 350) to determine whether there is an indication that an audio message should be sent. If any message handling input has been received that indicates that all or part of an audio message should be sent, the processor may determine that an audio message should be sent. If no message handling input has been received, following the most recent interrupted call, or no message handling input indicates an audio message should be sent, the processor may determine that an audio message should not be sent.

Alternatively, or additionally, the processor may further analyze the content of the audio recorded in block 220 to determine whether the audio message should be sent. The further analysis of the content of the audio may ensure that audio is not inadvertently or accidentally recorded and transmitted as part of a message as described above.

In response to determining that an audio message should be sent to another participant of the most recent interrupted call (i.e., determination block 355="Yes"), the processor may generate a message from recorded audio in block 230 as described for the method 200 with reference to FIG. 2. The intended recipients of the generated message (i.e., at least one second communication device) may be determined from the new message handling input registered in block 350, which may be based on the user input. In response to determining that no audio message should be sent to another participant of the most recent interrupted call (i.e., determination block 355="No"), the processor may determine whether to send an alternative message in determination block 365.

In determination block 365, the processor may determine whether an alternative message should be sent. The processor may make this determination by checking whether any new message handling inputs associated with the most recent interrupted call indicates that an alternative message should be sent to another participant of the interrupted active voice call. For example, the processor may compare the register of new message handling inputs (e.g., block 350) to determine whether there is an indication that an alternative message should be sent. If any message handling input has been received that indicates that an alternative message should be sent, then the processor may determine that an alternative message should be sent. If no message handling input has been received, following the most recent interrupted call, or no message handling input indicates that an alternative message should be sent, then the processor may determine that an alternative message should not be sent.

In response to determining that an alternative message should be sent to another participant of the most recent interrupted call (i.e., determination block 365="Yes"), the processor may transmit that alternative message in block 240 as described for the method 200 with reference to FIG. 2. In response to determining that no alternative message should be sent to another participant of the most recent interrupted call (i.e., determination block 365="No"), the processor may end the post-call handling operations in block 380.

FIG. 4 illustrates a communication device 111 with a display including a generated call-end indication in accordance with some embodiments. With reference to FIGS. 1-4, the communication device 111 may include a touch screen panel providing a display 400 for generating the call-end indication.

In various embodiments, once a processor of the communication device 111 receives an indication that an active voice call has been interrupted, the processor may generate a call-end indication to inform the user that the active call has ended. The call-ended indication may include one or more outputs presented on the display 400. For example, in FIG. 4, the display 400 may include an alert message 410 that reads, "Call Ended," or some similar text or icon image. In addition, the display 400 may include a recording message 420 (e.g., "Recording") and indicators that audio inputs are being recorded. One indicator that audio input is being recorded may be a sound level bar 430 and/or a running clock 435 showing a cumulative length (e.g., 00:04.3) of the currently recorded message.

The communication device 111 may also display user interface input icons for enabling a user to control or manage recorded audio. For example, the user interface input icons may include recording controls 441 that allow a user to pause, playback, or stop the recording of the audio. As another example, the user interface input icons may include a call recovery control 443 configured to immediately call back the other communication device. The call recovery control 443 may be automatically associated with additional functions that also immediately transmit a generated audio message (e.g., block 230 in FIG. 2) or end the operation of the method 300 (e.g., block 380 in FIG. 3). As another example, the user interface input icons may include a message handling control 445 configured to only transmit the generated audio message. The message handling control 445 may cause the processor to generate one audio message to be transmitted to the other communication device, while continuing to record further audio. Alternatively, the message handling control 445 may cause the processor to generate the audio message and stop further recording.

FIG. 5 illustrates the communication device 111 with the display including additional call-end indications in accordance with some embodiments. With reference to FIGS. 1-5, the display 400 may be configured to provide additional user interface input icons for managing recorded audio. For example, the user interface input icons may include a prompt 520 (e.g., "Transmit recorded audio?") encouraging the user to provide input on how or whether to transmit recorded audio to another communication device. The controls may include a playback control 530, which may allow the user to sample recorded audio before deciding whether to send it to another user. As another example, the user interface input icons may include more refined message handling controls, such as an audio file transmission control 541 and a text file transmission control 543. The audio file transmission control 541 may be configured to direct the processor to transmit recorded audio or other multimedia file in a file format that may be used to playback at least recorded audio at the other communication device. The text file transmission control 543 may be configured to direct the processor to transmit a transcript of recorded speech within recorded audio to the other communication device. The message handling controls may also include a decline transmission control 545 that may be configured to stop the communication device from transmitting recorded audio. Optionally, the decline transmission control 545 may immediately clear recorded audio from the memory buffer. Further example user interface input icons may include the call recovery control 443 and/or an alternative message control 549. The alternative message control 549 may be configured to direct the processor to transmit an SMS message to the other communication device. The SMS message may be a predetermined text message or an intermediate input screen may be provided to receive a new text message input from the user.

FIG. 6 illustrates a communication device 111 with a display including indications that a call is or will experience interruption or diminished quality such that call experience is affected, in accordance with various embodiments. With reference to FIGS. 1-6, the display 400 may be configured to provide one or more call-degradation indications.

In accordance with some embodiments, once a processor of the communication device 111 receives an indication that an active voice call is or will experience interruption or diminished quality such that call experience is affected, the processor may generate a call-degradation indication to inform the user that the active call may end soon. The call-degradation indication may include one or more outputs presented on the display 400. For example, in FIG. 6, the display 400 may include an alert message 610 that reads, "Bad Connection," or some similar text or icon image. In addition, the display 400 may include the recording message 420, the sound level bar 430, the running clock 435, and/or the message handling control 445, as described above. Unlike the display 400 associated with FIGS. 4 and 5, since the active voice call may not have ended, the display 400 in FIG. 6 may not include the call recovery control (e.g., 443).

Figure 7:
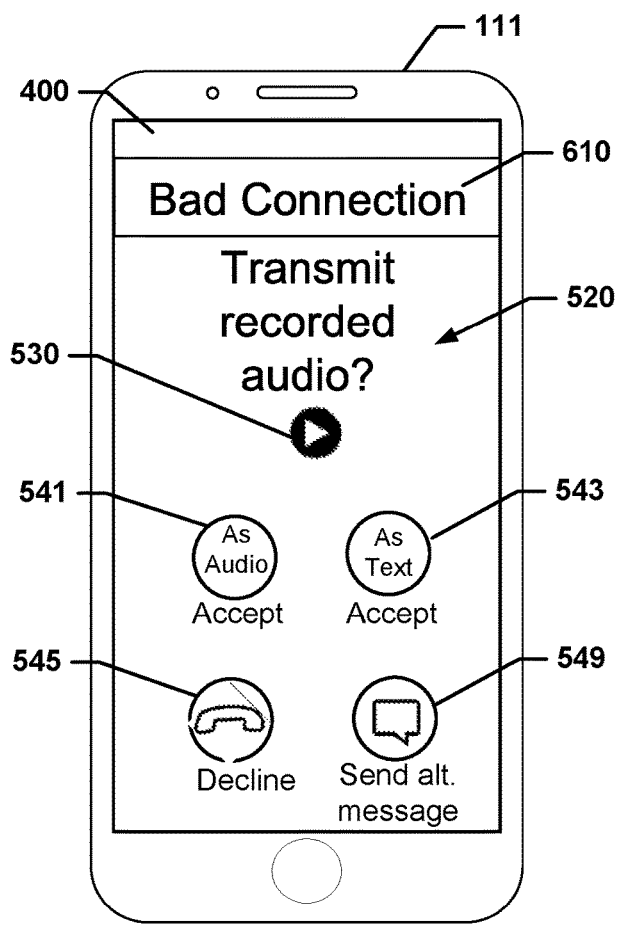
FIG. 7 is a diagram illustrating the embodiment display of FIG. 6 with additional call bad connection indications in accordance with various embodiments.

FIG. 7 illustrates the communication device 111 with the display including additional indications that a call is or will experience interruption or diminished quality such that call experience is affected, in accordance with various embodiments. With reference to FIGS. 1-7, the display 400 may be configured to provide user interface input icons for enabling a user to control or manage recorded audio. The user interface input icons may include the playback control 530, the audio file transmission control 541, the text file transmission control 543, the decline transmission control 545, and the alternative message control 549, as described with reference to FIGS. 4 and 5. Unlike the display 400 associated with FIGS. 4 and 5, the display 400 in FIG. 7 may not include the call recovery control (e.g., 443) since the active voice call may not have ended.

Figure 8:
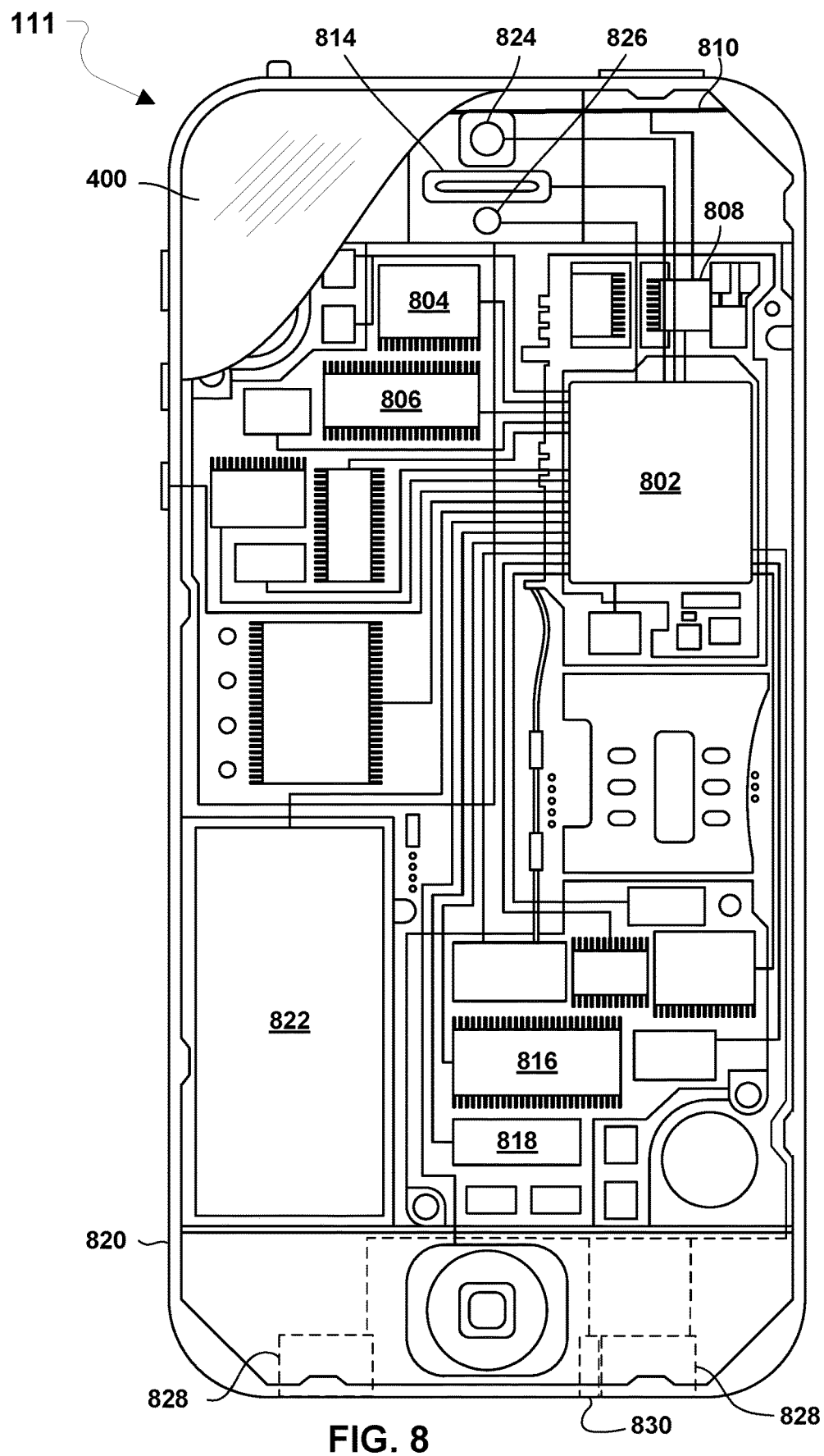
FIG. 8 is a component block diagram illustrating an example communication device suitable for use with various embodiments.

Various embodiments may be implemented in any of a variety of communication devices 111, 112, an example of which is illustrated in FIG. 8. With reference to FIGS. 1-8, the communication device 111 may include a processor 802 coupled to a touch screen controller 804 and an internal memory 806. The processor 802 may be one or more multi-core ICs designated for general or specific processing tasks. The internal memory 806 may be volatile or non-volatile memory, and may also be secure and/or encrypted memory, or unsecure and/or unencrypted memory, or any combination thereof.

The touch screen controller 804 and the processor 802 may also be coupled to the display 400, which may be a touch screen panel such as a resistive-sensing touch screen, capacitive-sensing touch screen, infrared sensing touch screen, etc. The communication device 111 may have one or more radio signal transceivers 808 (e.g., Peanut®, Bluetooth®, Zigbee®, Wi-Fi, RF radio) and antennae 810, for sending and receiving, coupled to each other and/or to the processor 802. The radio signal transceivers 808 and antennae 810 may be used with the above-mentioned circuitry to implement the various wireless transmission protocol stacks and interfaces. The communication device 111 may include a cellular network wireless modem chip 816 that enables communication via a cellular network and is coupled to the processor. The communication device 111 may include a peripheral device connection interface 818 coupled to the processor 802. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown). The communication device 111 may also include one or more speakers 828 for outputting audio and the microphone 830 for receiving audio inputs. The communication device 111 may also include a housing 820, constructed of a plastic, metal, or a combination of materials, for containing all or some of the components discussed herein. The communication device 111 may include a power source 822 coupled to the processor 802, such as a disposable or rechargeable battery. In addition, the communication device 111 may include additional sensors, such as a motion sensor 814, a forward-facing image sensor 824, and a rearward facing image sensor 826, coupled to the processor 802 for providing sensor input.

The processor 802 may be any programmable microprocessor, microcomputer or multiple processor chip or chips that can be configured by software instructions (applications) to perform a variety of functions, including the functions of various embodiments as described. In some devices, multiple processors may be provided, such as one processor dedicated to wireless communication functions and one processor dedicated to running other applications. Typically, software applications may be stored in the internal memory 806 before they the software applications are accessed and loaded into the processor 802. The processor 802 may include internal memory sufficient to store the application software instructions. In many devices, the internal memory may be a volatile or nonvolatile memory, such as flash memory, or a mixture of both. For the purposes of this description, a general reference to memory refers to memory accessible by the processor 802, including internal memory or removable memory plugged into the device and memory within the processor 802 itself.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method implemented on a communication device, comprising:
   receiving, by a processor of the communication device, an indication that a conversation from an active voice call with another communication device is experiencing or will experience interruption or diminished quality such that call experience is affected, wherein the indication is generated in response to a detection of an active voice call parameter threshold value being reached;
   recording audio received from a microphone of the communication device in response to receiving the indication that the conversation from the active voice call is experiencing or will experience interruption or diminished quality such that call experience is affected;
   generating a message from recorded audio; and
   transmitting the generated message to the other communication device.

2. The method of claim 1, further comprising:
   determining, by the processor, whether recorded audio includes speech; and
   including at least a portion of the speech from recorded audio in the generated message.

3. The method of claim 1, further comprising:
   determining, by the processor, when a user stops speaking in recorded audio; and
   stopping recording of the audio in response to determining that the user has stopped speaking.

4. The method of claim 1, further comprising determining, by the processor, whether a user of the communication device is speaking after receiving the indication that conversation from the active voice call with another communication device is or will experience interruption or diminished quality such that call experience is affected.

5. The method of claim 1, wherein the generated message includes an audio recording including at least a portion of recorded audio.

6. The method of claim 1, wherein the generated message includes a transcription of speech detected in at least a portion of recorded audio.

7. The method of claim 1, wherein the generated message includes additional information that identifies the active voice call.

8. The method of claim 1, wherein the generated message includes additional information directing a user of the other communication device to switch to another mode of communication.

9. The method of claim 1, wherein recording the audio received comprises recording the audio while the active voice call remains active in response to the received indication indicating that conversation from the active voice call is or will experience interruption or diminished quality such that call experience is affected.

10. A communication device, comprising:
    a microphone;
    a transceiver; and
    a processor coupled to the microphone and the transceiver and configured with processor-executable instructions to perform operations comprising:
       receiving an indication that a conversation from an active voice call with another communication device is experiencing or will experience interruption or diminished quality such that call experience is affected, wherein the indication is generated in response to a detection of an active voice call parameter threshold value being reached;
       recording audio received from the microphone in response to receiving the indication that the conversation from the active voice call is experiencing or will experience interruption or diminished quality such that call experience is affected;
       generating a message from recorded audio; and
       transmitting, using the transceiver, the generated message to the other communication device.

11. The communication device of claim 10, wherein the processor is configured with processor-executable instructions to perform operations further comprising:
    determining whether recorded audio includes speech; and
    including at least a portion of the speech from recorded audio in the generated message.

12. The communication device of claim 10, wherein the processor is configured with processor-executable instructions to perform operations further comprising:
    determining when a user stops speaking in recorded audio; and
    stopping recording of the audio in response to determining that the user has stopped speaking.

13. The communication device of claim 10, wherein the processor is configured with processor-executable instructions to perform operations further comprising determining whether a user of the communication device is speaking after receiving the indication that conversation from the active voice call with another communication device is or will experience interruption or diminished quality such that call experience is affected.

14. The communication device of claim 10, wherein the processor is configured with processor-executable instructions to perform operations such that the generated message includes an audio recording including at least a portion of recorded audio.

15. The communication device of claim 10, wherein the processor is configured with processor-executable instructions to perform operations such that the generated message includes a transcription of speech detected in at least a portion of recorded audio.

16. The communication device of claim 10, wherein the processor is configured with processor-executable instructions to perform operations such that the generated message includes additional information that identifies the active voice call.

17. The communication device of claim 10, wherein the processor is configured with processor-executable instructions to perform operations such that the generated message includes additional information directing a user of another communication device to switch to another mode of communication.

18. The communication device of claim 10, wherein the processor is configured with processor-executable instructions to perform operations such that recording the audio received comprises recording the audio while the active voice call remains active in response to the received indication indicating that conversation from the active voice call is or will experience interruption or diminished quality such that call experience is affected.

19. A non-transitory processor-readable storage medium having stored thereon processor-executable instructions configured to cause a processor of a communication device to perform operations comprising:
    receiving an indication that a conversation from an active voice call with another communication device is experiencing or will experience interruption or diminished quality such that call experience is affected, wherein the indication is generated in response to a detection of an active voice call parameter threshold value being reached;

recording audio received from a microphone of the communication device in response to receiving the indication that the conversation from the active voice call is experiencing or will experience interruption or diminished quality such that call experience is affected;

generating a message from recorded audio; and transmitting the generated message to the other communication device.

20. The non-transitory processor-readable storage medium of claim 19, wherein the stored processor-executable instructions are configured to cause the of a communication device to perform operations further comprising:

determining whether recorded audio includes speech; and including at least a portion of the speech from recorded audio in the generated message.

21. The non-transitory processor-readable storage medium of claim 19, wherein the stored processor-executable instructions are configured to cause the of a communication device to perform operations further comprising:

determining when a user stops speaking in recorded audio; and stopping recording of the audio when the user has stopped speaking.

22. The non-transitory processor-readable storage medium of claim 19, wherein the stored processor-executable instructions are configured to cause the of a communication device to perform operations further comprising:

determining whether a user of the communication device is speaking after receiving the indication that conversation from the active voice call with another communication device is or will experience interruption or diminished quality such that call experience is affected.

23. The non-transitory processor-readable storage medium of claim 19, wherein the stored processor-executable instructions are configured to cause the of a communication device to perform operations such that the generated message includes an audio recording including at least a portion of recorded audio.

24. The non-transitory processor-readable storage medium of claim 19, wherein the stored processor-executable instructions are configured to cause the of a communication device to perform operations such that the generated message includes a transcription of speech detected in at least a portion of recorded audio.

25. The non-transitory processor-readable storage medium of claim 19, wherein the stored processor-executable instructions are configured to cause the of a communication device to perform operations such that the generated message includes additional information that identifies the active voice call.

26. The non-transitory processor-readable storage medium of claim 19, wherein the stored processor-executable instructions are configured to cause the of a communication device to perform operations such that the generated message includes information directing a user of the other communication device to switch to another mode of communication.

27. The non-transitory processor-readable storage medium of claim 19, wherein the stored processor-executable instructions are configured to cause the of a communication device to perform operations such that recording the audio received comprises recording the audio while the active voice call remains active in response to the received indication indicating that conversation from the active voice call is or will experience interruption or diminished quality such that call experience is affected.

28. A communication device, comprising:

means for receiving an indication that a conversation from an active voice call with another communication device is experiencing or will experience interruption or diminished quality such that call experience is affected, wherein the indication is generated in response to a detection of an active voice call parameter threshold value being reached;

means for recording audio received from means for sampling ambient audio signals in response to receiving the indication that the conversation from the active voice call is experiencing or will experience interruption or diminished quality such that call experience is affected;

means for generating a message from recorded audio; and means for transmitting the generated message to the other communication device.

29. The communication device of claim 28, further comprising:

means for determining whether recorded audio includes speech, wherein the generated message includes at least a portion of the speech from recorded audio.

30. The communication device of claim 28, further comprising:

means for determining when a user stops speaking in recorded audio; and means for stopping the recording of the audio in response to determining that the user has stopped speaking.

* * * * *